US010102279B2

United States Patent
Focacci

(10) Patent No.: US 10,102,279 B2
(45) Date of Patent: Oct. 16, 2018

(54) SYSTEM FOR CLASSIFYING CHARACTERIZED INFORMATION

(71) Applicant: TRANSPARINT, LLC, Little Falls, NJ (US)

(72) Inventor: Christian A. Focacci, Little Falls, NJ (US)

(73) Assignee: TRANSPARINT, LLC., Little Falls, NJ (US)

( * ) Notice: Subject to any disclaimer, the term of this patent is extended or adjusted under 35 U.S.C. 154(b) by 746 days.

(21) Appl. No.: 14/686,202

(22) Filed: Apr. 14, 2015

(65) Prior Publication Data

US 2015/0302097 A1    Oct. 22, 2015

Related U.S. Application Data

(60) Provisional application No. 61/981,063, filed on Apr. 17, 2014.

(51) Int. Cl.
*G06F 17/30* (2006.01)

(52) U.S. Cl.
CPC .............. *G06F 17/30705* (2013.01)

(58) Field of Classification Search
None
See application file for complete search history.

(56) References Cited

U.S. PATENT DOCUMENTS

2014/0250196 A1*  9/2014  Joao ............... G06F 17/30864
                                                        709/206
2015/0088897 A1*  3/2015  Sherman .............. G06Q 10/00
                                                        707/740

OTHER PUBLICATIONS

Thomson Reuters; World-Check Risk Intelligence-KYC, AML, CFT, PEP Due Diligence; retrieved Jul. 14, 2015; https://risk.thomsonreuters.com/products/world-check.
LexisNexis; Global Risk Management Solutions; retrieved Jul. 14, 2015; http://www.lexisnexis.com/risk/intl/en/.
Risk Intelligence; RDC Regulatory Data Corp; Available at least as early as Feb. 10, 2014; Available at http://rdc.com
Factiva; Dow Jones; retrieved Jul. 14, 2015; http://new.dowjones.com/products/factiva/.

* cited by examiner

*Primary Examiner* — Belix M Ortiz Ditren
(74) *Attorney, Agent, or Firm* — Workman Nydegger

(57) ABSTRACT

A computerized method for searching one or more information sources and identifying and reporting characterized information can comprise searching one or more data sources for a user-provided search target. The method can also comprise receiving one or more data results from the search of the one or more data sources. Additionally, the method can comprise classifying the one or more data results based upon the association of the user-provided search target with a derogatory attribute. The derogatory attribute can be determined based upon the content within each of the one or more data results. The method can comprise displaying an indication of at least a portion of the classified one or more data results with an indication of a cumulative ranking for each of the one or more data results.

21 Claims, 6 Drawing Sheets

SYSTEM FOR CLASSIFYING CHARACTERIZED INFORMATION

CROSS-REFERENCE TO RELATED APPLICATIONS

This application claims priority to and the benefit of U.S. Provisional Application No. 61/981,063, filed on Apr. 17, 2014, entitled "SYSTEM FOR CLASSIFYING CHARACTERIZED INFORMATION," which is incorporated by reference herein in its entirety.

BACKGROUND OF THE INVENTION

1. Technical Field

Embodiments of the present invention relate to computerized systems for identifying derogatory information.

2. Background and Relevant Art

Gathering and classifying information, particularly information available on the Internet, can be a difficult task due to the expansive amount of information and the lack of structured classification within the information. For example, an organization may desire to perform a background check on an individual. Specifically, the organization may desire to know if an individual has been previously associated with fraud, money laundering, funding or terrorism, or some other illegal activity. While the Internet provides tremendous amounts of searchable data, it is very difficult for a user to quickly search through the large quantities of data and find correctly characterized data relating to the individual of interest.

In response to this difficulty, various organizations provide procured databases of information. Many of these organizations generate these databases by employing individuals who search various information sources, including the Internet, for specific data and manually enter the data as it is found. Examples of these manually curated databases may be used by financial institutions to meet "Know Your Client" requirements.

The resulting databases can provide useful information relating to particular topics. The information within these databases, however, is often out of data because the databases are only updated as fast as information is manually categorized and manually added to the database. One will appreciate, however, the technical difficulties in automating a process of data gathering and data characterization.

Accordingly, there is a need for innovation and solutions within the field of characterized data searches.

BRIEF SUMMARY OF THE INVENTION

Implementations of the present invention comprise systems, methods, and devices configured to search for characterized information that is associated with a particular received variable. In at least one implementation, the characterized information may comprise derogatory information. Implementations of the present invention comprise various components that are configured to receive a search target and classify resulting data based upon characterized content associated with the search target. Additionally, at least one implementation of the present invention receives feedback from a user regarding the classified resulting data, and uses the feedback to increase the accuracy of future classifications.

For example, implementations of the present invention can include a computerized method for searching one or more information sources and identifying and reporting characterized information. The method can comprise searching one or more data sources for a user-provided search target. The method can also comprise receiving one or more data results from the search of the one or more data sources.

Additionally, the method can comprise classifying the one or more data results based upon the association of the user-provided search target with a derogatory attribute. The derogatory attribute can be determined based upon the content within each of the one or more data results. The method can comprise displaying an indication of at least a portion of the classified one or more data results with an indication of a cumulative ranking for each of the one or more data results.

An additional implementation of the present invention can comprise a system to implement a method for providing a user with ranked search results. The method can comprise receiving a data result that comprises at least one instance of a user-provided search target. The method can also comprise accessing at a first memory location a first data structure that contains one or more first data structure search targets. The first data structure can also be associated with a first weighting factor.

Additionally, the method can comprise accessing at a second memory location a second data structure that contains one or more second data structure search targets. The second data structure can be associated with a second weighting factor, which is different than the first weighting factor. Further, the method can comprise calculating a ranking of the data result based upon a number of first data structure search targets that are within at least a portion of the data result, the first weighting factor, a number of second data structure search targets that are within the at least a portion of the data result, and the second weighting factor. Further still, the method can comprise displaying the ranking for the data result.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
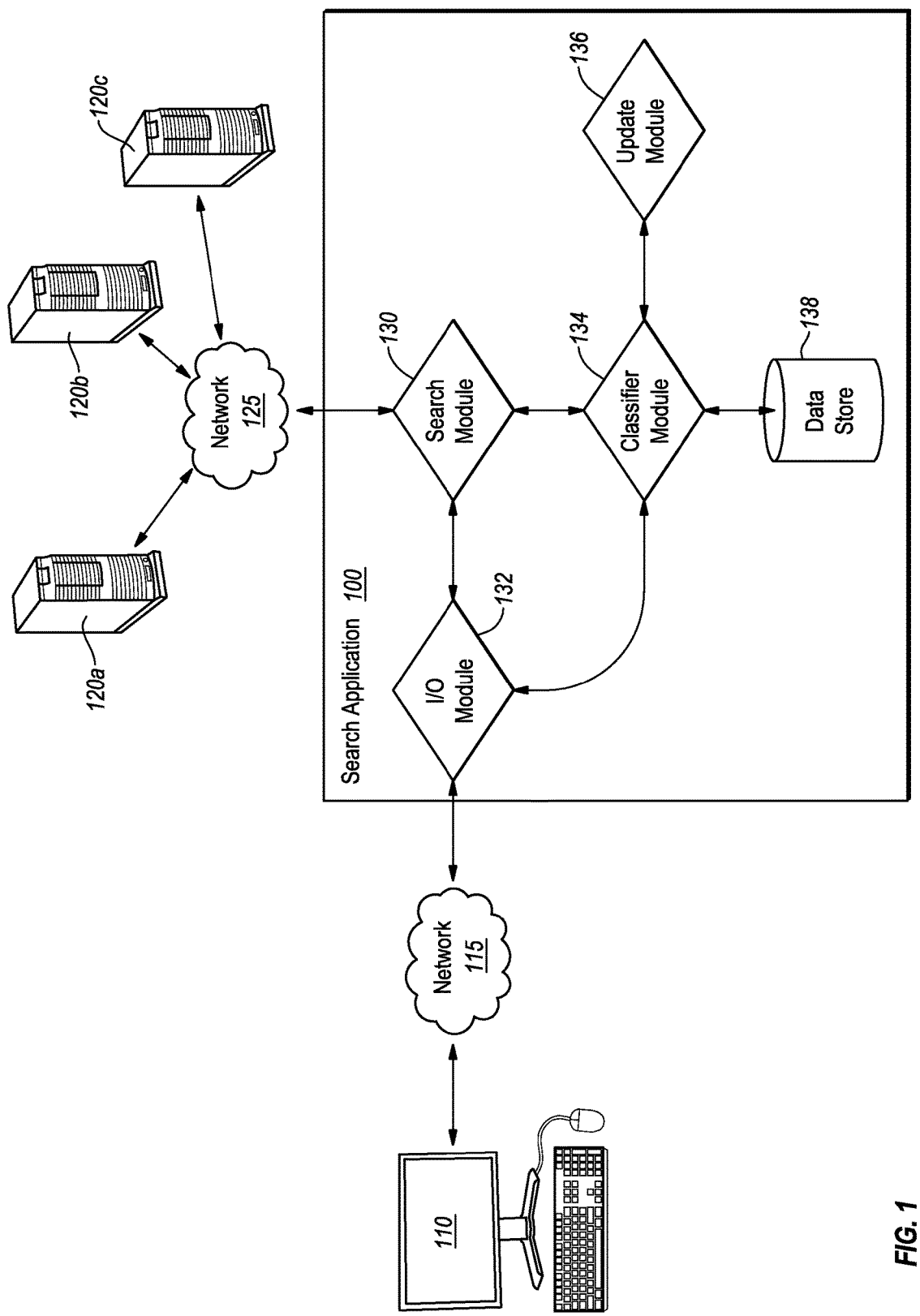
FIG. 1 illustrates a schematic diagram of a system for identifying and classifying characterized information in accordance with an implementation of the present invention.

The present invention extends to systems, methods, and devices configured to search for characterized information that is associated with a particular received variable. In at least one implementation, the characterized information may comprise derogatory information. Implementations of the present invention comprise various components that are configured to receive a search target and classify resulting data based upon characterized content associated with the search target. Additionally, at least one implementation of the present invention receives feedback from a user regarding the classified resulting data, and uses the feedback to increase the accuracy of future classifications.

Accordingly, at least one implementation of the present invention allows an individual to search the Internet, along with other data sources, for information (such as derogatory information) associated with a particular variable. As understood herein, "characterized information" means information that has been determined to be associated with a certain judgment or judgment-type value, such as "positive," "negative," "derogatory," or the like. Thus, for example, an account manager at a bank can enter a potential new client's name into a search interface of the present invention. Implementations of the present invention can return a collection of results that contain a listing of characterized information that is potentially associated with the client, such as negative or derogatory information. In at least one implementation, the account manager can use the collection of results to fulfill anti-money laundering requirements instituted by regulation, or to otherwise become more aware of the prospective new client (i.e., in a "Know Your Client" program, discussed herein).

One will appreciate, therefore, that implementations of the present invention can be used to work with any type of characterized information for any particular purpose required by the end-user. As such, any particular reference to the terms "derogatory," "positive," "negative," or the like is made merely for purposes of efficiency in describing one particular type of characterized information.

For example, in at least one implementation of the present invention, characterized information can be used to detect the risk of an individual or organization being involved in money laundering. In determining the risk of involvement with money laundering, various data sources (e.g., public databases, private databases, the Internet, etc.) can be searched for information that contains the individual's or organization's name. As information containing the appropriate name is discovered, implementations of the present invention can search for money laundering related key words within the discovered information. For instance, words such as drugs, terrorism, Al Qaeda, fraud, money laundering, and other related words can be identified within the discovered information.

Implementations of the present invention can comprise a classifier module which can then analyze the discovered information to determine how closely the key words are associated to the name of the individual or organization. This can include determining how frequently the words appear within the information and how closely the words appear to the name of the individual or organization. The classifier module can then calculate a ranking or score that provides an indication of the likelihood that the discovered information associates the individual or organization with money laundering.

Turning now to the figures, FIG. 1 illustrates a schematic diagram of a system for identifying and classifying characterized information (e.g., derogatory information) in accordance with an implementation of the present invention. While FIG. 1 depicts discrete modules and information flows, one will understand that division of modules and information flow is only provided for the sake of clarity and discussion. Alternative embodiments may contain a fewer or greater number of modules or may divide the actions between the modules in a way that is different than what is depicted in FIG. 1.

In at least one implementation, a client computer 110 can display to a user a frontend interface that is configured to receive a search target from a user. The search target may comprise an individual's name, a company name, an organization name, or any other term or name. Upon receiving the search target, the client computer 110 can communicate the search target to a search application 100 through a network connection 115. In various implementations, the client computer 110 can execute the search application 100, such that a network connection 115 is not required, or a remote server can execute the search application 100.

The IO module 132 of the search application can receive the search target and provide the information to the search module 130. In at least one implementation, the search module 130 can generate one or more search queries that conform with various formatting requirements of various target data sources 120(a-c). For example, the search module 130 can create search queries that can be sent through network connection 125 to various Internet search engines 120a, private databases 120b, government watch lists 120c, and other similar computer accessible data sources. Additionally, the search module 130 can add specific parameters to the search queries that are directed towards returning derogatory information.

For example, the search module 130 may search for a target of "John Doe." Upon receiving "John Doe," the search module 130 can create various search queries that are directed towards returning derogatory information that is associated with "John Doe." When creating the search queries, the search module 130 can incorporate within the search queries various search parameters, including keywords from a pre-defined list of keywords that relate to particular types of derogatory information (e.g., money laundering, fraud, drug trafficking, terrorism, etc.). In contrast, in at least one implementation, the search module 130 only searches for the search target and does not add additional terms to the search.

Additionally, the search module 130 can include search parameters that exclude certain results and/or data sources from the search. For instance, when creating a search query for an Internet search engine, the search module 130 may include a parameter that excludes certain websites (e.g., EBAY) from the search. In at least one implementation, the search module 130 may exclude a list of sites from its searches. These sites may comprise data sources that are known to be unreliable, known to contain non-applicable information, or websites that are otherwise undesirable.

In at least one implementation, the search module 130 can create search queries using publicly available APIs provided by various Internet search engines 120(*a-c*). Additionally, the search module 130 can create search queries that are directed towards public and private database systems. For example, a search query can be created that is configured to access a privately created and managed anti-money laundering database. Similarly, a search query can be created that is configured to search specific government provided databases, such as databases provided by "Her Majesty Treasury List," "the Bureau of Industry and Security," "the Department of State," "the EU Terrorism List," "the FBI Top Ten Most Wanted, the Interpol Most Wanted," "the ICE List," "the Office of Foreign Assets Control," "the CBI List," "the SDN & Blocked Entities," "the SECO List," "the Treasury PML List," "the UN Consolidated List," "the OCC Shell Bank List," "the World Bank Debarred Parties List," "the CIA World Leader list," and other similar data sources.

When sending search queries to the various databases, the search module 130 can route the search queries through a proxy and/or encrypt the search queries to provide privacy protection for the individuals/entities that are being searched. Additionally, in at least one implementation, the search queries can be submitted to various search engines in a way that prevents the search engine from developing a search profile for the search module 130. For example, the search module 130 can erase cookies prior to each search. Preventing a search engine from building a profile for the search module 130 may help avoid skewing search results based upon previous searches that were run under a search profile.

Once the various search queries have been generated and communicated to the various data sources, the search module 130 can receive the search query results from the various data sources. In at least one implementation, the search module 130 can reformat the received search query results from the various data sources, such that the search module 130 generates a cumulative list of search results that contains the information from each data source, but in a single unified format. Additionally, the search module 130 can remove duplicate search results from the collection of search query results.

In at least one implementation, the search application 100 can also comprise a classifier module 134. The classifier module 134 can be configured to analyze the various search results and classify each result based upon a likelihood that the result comprises certain characterized information, such as derogatory information, that is associated with the search target. In at least one implementation, the classifier module 134 can implement machine learning, natural language processing, bigrams and various other algorithms/text processing methods to classify the various search results.

When in use, the classifier module 134 can tokenize a particular search result and determine how closely and how often keywords appear with the search target within the search result. In at least one implementation, the classifier module 134 can classify a search result based upon the presence of diversely weighted words and phrases within proximity to the search target within the search result.

For example, in at least one implementation, the classifier module 134 can access various data structures that each comprise unique lists of words and/or phrases. For example, a first data structure may comprise words and phrases ("first data structure search targets") that either ambiguously indicate derogatory information or that do not strongly infer derogatory information. For instance, the first data structure search targets may comprise words such as "bad," "crime," "jail," and other similar words. In at least one implementation, the first data structure search targets can comprise wildcard characters or roots of words to insure that words in the various tenses and forms are identified. One will understand that the mere presence of the word "bad" and the name "John Doe" within an article may not necessarily mean that John Doe is bad.

In contrast, a second data structure may comprise longer and/or different words and phrases than the first data structure. For example, the second data structure may comprise phrases ("second data structure search targets") such as "was convicted," "indicted for," "charged with," and similar phrases. The second data structure search targets may more strongly indicate a derogatory association with the search target. For example, the presence of the phrase "was convicted" and the name "John Doe" may more strongly indicate a derogatory characterization of John Doe.

Further, in at least one implementation, a third data structure may comprise phrases that strongly indicate a derogatory association. Additionally, in at least one implementation, the third data structure may comprise wildcard characters that allow the classifier module 134 to dynamically substitute a word within one of the third data structure's words and phrases ("third data structure search targets"). For example, the third data structure search targets may comprise phases like "* was indicted for money laundering," "* was convicted," and other similar phrases. In at least one implementation, the "*" character may indicate a wildcard character that can be used for dynamically substituting in the search target. For instance, the classifier module 134 can identify the presence of "John Doe was convicted" within a search result by dynamically substituting the wildcard character, "*," with the search target "John Doe." One will understand that the third data structure search targets provide a very strong indication of a derogatory characterization of the search target.

While an example of three data structures has been provided, one will understand that in various implementations of the present invention any number of data structures can be used. Additionally, one will understand that each data structure may also comprise a diversity of term and phrase lengths, a diversity of wildcard characters, and a diversity of other attributes. As such, various implementations of data structures may comprise a wide range of characteristics that each account for a similar level of "weight" with respect to characterized information.

Figure 2:
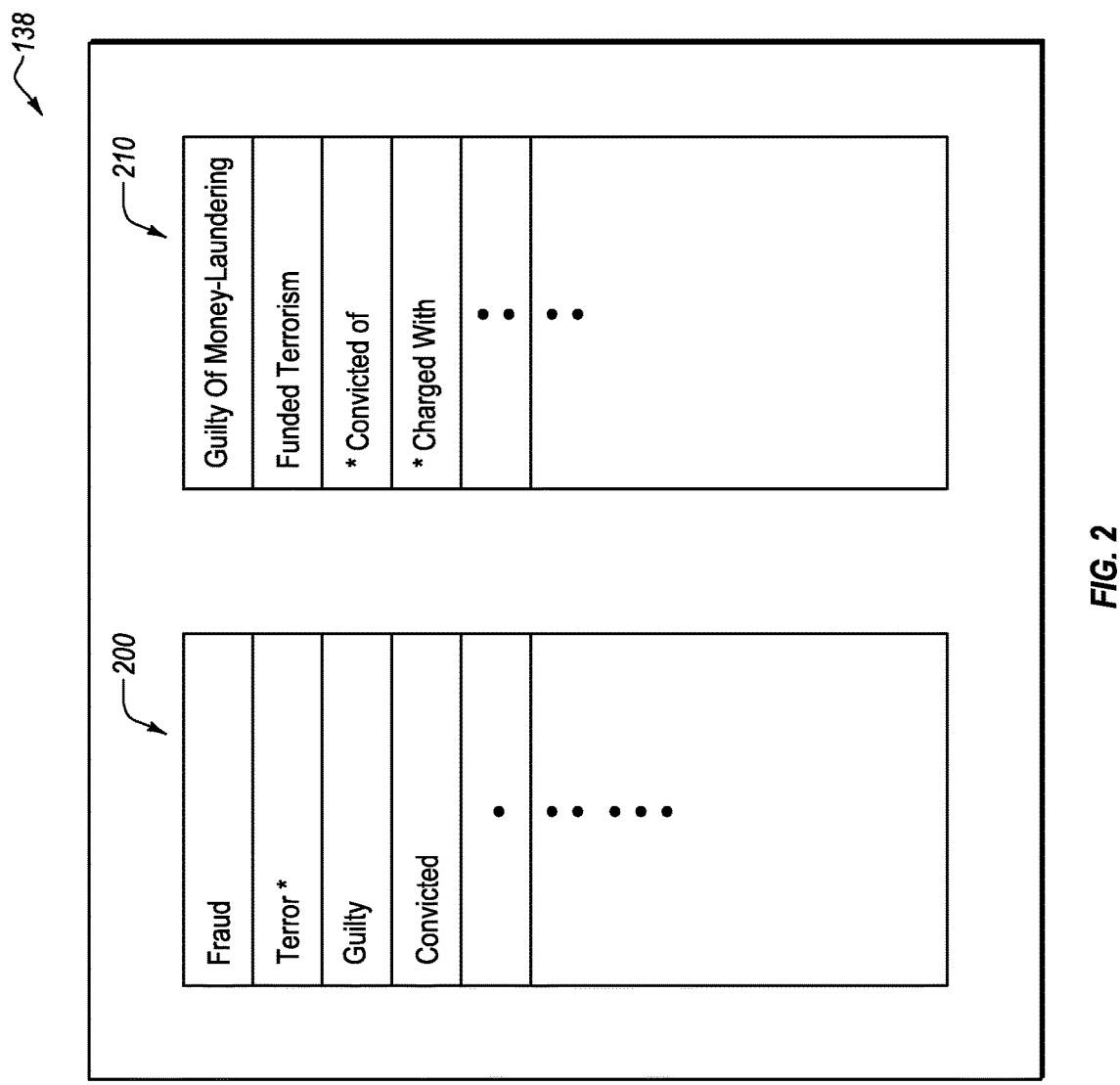
FIG. 2 illustrates another schematic diagram of a first data structure and a second data structure in accordance with an implementation of the present invention.

FIG. 2 depicts a visual representation of data structures 200, 210 as stored within data store 138. The data store 138 may contain any number of distinct data structures 200, 210. In at least one implementation, the data structure search targets are manually generated by human-users. In contrast, in at least one implementation, the data structure search targets can also be automatically generated. For example, as the classifier module 134 identifies search results that are most often accessed by an end-user, the classifier module 134 can identify terms and phrases of interest within the selected search results that are not within the other search results. The classifier module 134 can then add these terms and phrases to data structures stored within the data store 138.

Each of the data structures may be associated with a particular weighting factor. The weighting factor may be determined based upon the strength of the derogatory characterization associated with each respective data structure. For example, the weighting factor associated with the exemplary first data structure above may be less than the weighting factor associated with the exemplary second data structure described above. Further, the weighting factor associated with the exemplary second data structure described above may itself be less than the weighting factor associated with the exemplary third data structure described above.

When analyzing a search result, the classifier module 134 can identify the location(s) of the search target (e.g., "John Doe") within the search result. The classifier module 134 can then determine the number of data structure search targets from each respective data structure that are within at least a portion of a particular data result. For example, the classifier module 134 may determine how many first data structure search targets, second data structure search targets, and third data structure search targets are within a threshold number of words from a location of the search target within the search result. The threshold may comprise a user selectable sensitivity setting. As the user shrinks the threshold, there may be greater likelihood that first data structure search targets are describing the search target due to their proximity to the search target within the search result.

Once the classifier module 134 has identified the respective data structure search targets within the portions of interest within the data result, the classifier module 134 can calculate one or more rankings or scores for the data result. In at least one implementation, the classifier module 134 can generate a score for the data based upon the number of data structure search targets identified within at least a portion of the search result and the weighting factor that is associated with each respective data structure search target.

For example, the classifier module 134 may identify four instances of first data structure search targets, one instance of a second data structure search target, and two instances of third data structure search targets. The classifier module 134 can generate a score by multiplying the first data structure weighting factor by four, multiplying the second data structure weighting factor by one, the third data structure weighting factor by two, and then adding together the resulting products. In at least one implementation, the classifier module 134 can then normalize the resulting score. For example, the classifier module 134 may normalize the score such that it is on a scale of one to a hundred. Additionally, in at least one implementation, the classifier module 134 can divide the calculated score by the number of terms within the search result.

Additionally, in at least one implementation, when calculating a score or ranking, the classifier module 134 may also account for a locational weighting factor. For example, the classifier module 134 may apply a locational weighting factor based upon where the various data structure search targets were located. For instance, the classifier module 134 may apply a locational weighting factor to data structure search targets that were identified within a title of a search result or within the first paragraph of a search result. The classifier module 134 may multiply the data structure search targets that were identified within the title by their respective data structure weighting factors and by the locational weighting factor.

The location of a data structure search target within a title or first paragraph may give a stronger indication that an article is a derogatory characterization of a search target. A strong indication of a derogatory characterization may be particularly indicated when both the data structure search target and the search target are within the title or first paragraph. As such, in at least one implementation, the weighting factor comprises a higher weight than the first data structure weighting factor and the second data structure weighting factor.

In at least one implementation, a training set of articles and database items can be fed into the classifier module 134. The training set can include items that were manually identified as containing information of interest. Additionally, in at least one implementation, the classifier module can be configured into a training mode; however, in alternate implementations a training mode configuration may not be necessary for using a training set. When the classifier receives the training set, the classifier can analyze the various items within the training set and identify patterns and similarities between the items. As such, a user can affirmatively train a machine-learning component within the classifier module 134 using a training set of information.

After the search results have been classified and scored, a frontend interface can display a collection of the search results on the remote computer 110. In at least one implementation, only results that meet certain thresholds are displayed. The thresholds can include metrics such as risk score (e.g., above 85%), age of search result, etc. For example, the frontend interface can display a brief description of each search result that has a greater than 85% association between the search target and derogatory information, display an excerpt of interest from each search result, display the score or ranking received from the classifier, and display other various pertinent information regarding each search result. The search results can also be displayed in various pre-sorted orders. For example, the search results can be ordered by classifier rank, by the date that the particular search result was created, by geographic region associated with each search result, by data source, or in any number of other useful orders.

In the case that the returned search results all fall below a required threshold, the frontend interface can display a message notifying a user that no results meet the minimum threshold. Additionally, in at least one implementation, the frontend interface can still display at least a portion of the search results that fail to meet the threshold. In this way, a user is notified of the unlikely match of search results, but the user is also provided an opportunity to verify the search results.

In response to the display of the collection of search results, a user can review the results and select one or more of the search results that correctly associates derogatory information with the search target. In at least one implementation, upon receiving an indication that a user has selected the one or more search results, the classifier module 134 can analyze the selected one or more search results and identify various traits relating to the association between the search target and derogatory information within the search result. The classifier module 134 can incorporate the identified traits into its classification module, such that over time the classifier module becomes more accurate.

Additionally, in at least one implementation, the search application 100 can create an audit trail for every search that is performed. For example, the search application 100 can store the result of each search query, the actual queries that were run, the results that were selected by the user, the date and time that the search was executed, and/or various other information relating to each search. Accordingly, in at least one implementation, a user can provide records of previous searches that were executed.

Figure 3:
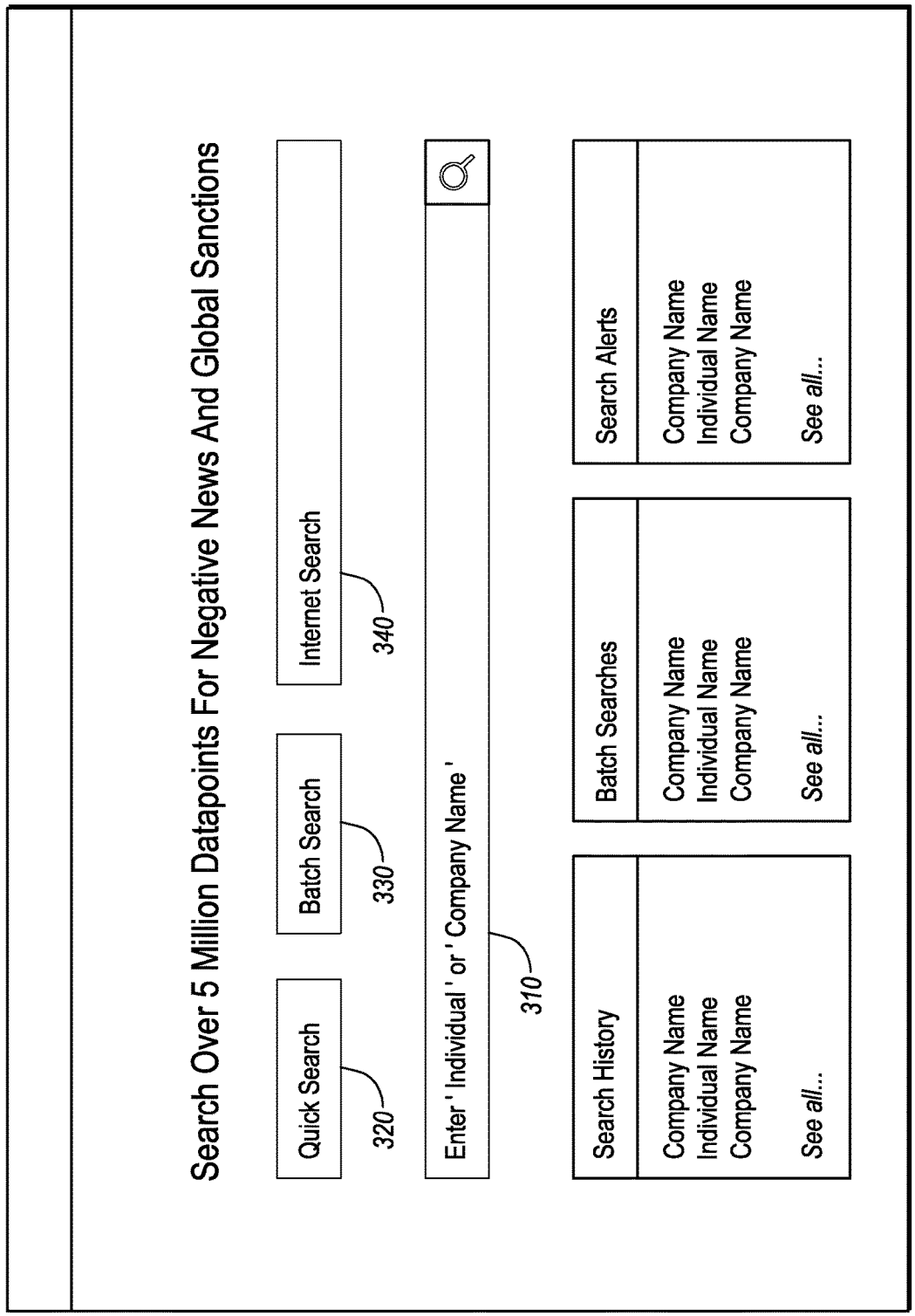
FIG. 3 illustrates a user interface configured to receive a search target in accordance with an implementation of the present invention.

FIG. 3 illustrates a front-end user interface 300 configured to receive a search target in accordance with an implementation of the present invention. Specifically, FIG. 3 shows that an exemplary user interface 300 can be configured to receive individual or company names and search for derogatory information associated with the respective individual or company names. The depicted user interface comprises a variety of different options and configurations.

For example, the depicted user interface 300 comprises three different types of searches: "Quick Search" 320, "Batch Search" 330, and "Internet Search" 340. The Quick Search option can provide the user with an interface for executing a single search regarding an individual or company against the available data sources. In contrast, the Batch Search option can provide the user with an interface for executing multiple searches regarding multiple respective individuals and/or companies within a single interface. The Internet Search can provide a standard Internet search engine search field for executing a standard Internet search.

In addition to the search options, the user interface of FIG. 3 also depicts various additional information categories. For example, a "Search History" section and a "Batch Searches" section are depicted, which comprise various links to reviewing and accessing previous searches on companies and individuals. In at least one implementation, the actual previously searched individuals and companies appear as links within the Search History section and the Batch Searches section, such that a user can select the link associated with, for example, John Doe and access the previous search on John Doe.

FIG. 3 also shows that the user interface can comprise a "Search Alerts" section. The Search Alert section can comprise information relating to ongoing searches. For example, a user may run a search on Acme Company to identify any associated derogatory information. In addition to running the one time search, the user may desire to be notified if any new derogatory information relating to Acme Company is posted to a data source.

To aid a user in receiving these updates, at least one implementation of the present invention involves the update module 136 allowing a user to request alerts when new information is posted to a data source. Additionally, in at least one implementation, a user can constrain the alerts that are provided. For example, a user can request only alerts from the update module 136 that meet a certain threshold rank or score. A user may also be able to dictate the frequency with which the individual data sources are searched for updates. For instance, the user may desire that the data sources be searched daily for information relating to Acme Company; while, in other situations, the user may only desire weekly or bi-weekly searches. In either case, when new information is discovered, the user interface can depict an alert within the Search Alerts section.

In at least one implementation, the search module 130 can identify when multiple different users at different client computers 110 have entered the same search target. For example, the search module 130 can identify that a specific search target has been requested more than a threshold number of times within a threshold time period. The search module 130 can notify the classifier module 134 of this behavior. In at least one implementation, the classifier module 134 can flag a particular search request. Additionally, the IO module 132 can display a warning flag to a user through the user interface 300.

This feature (and others disclosed herein) may be of particular benefit, within, for example, the banking field. For example, a bank may be attempting to determine if a potential client has any associations with money laundering or money fraud. An indication that the same individual is attempting to open accounts at multiple banks within a short period of time may indicate that the individual is engaged in a fraudulent scheme.

Figure 4:
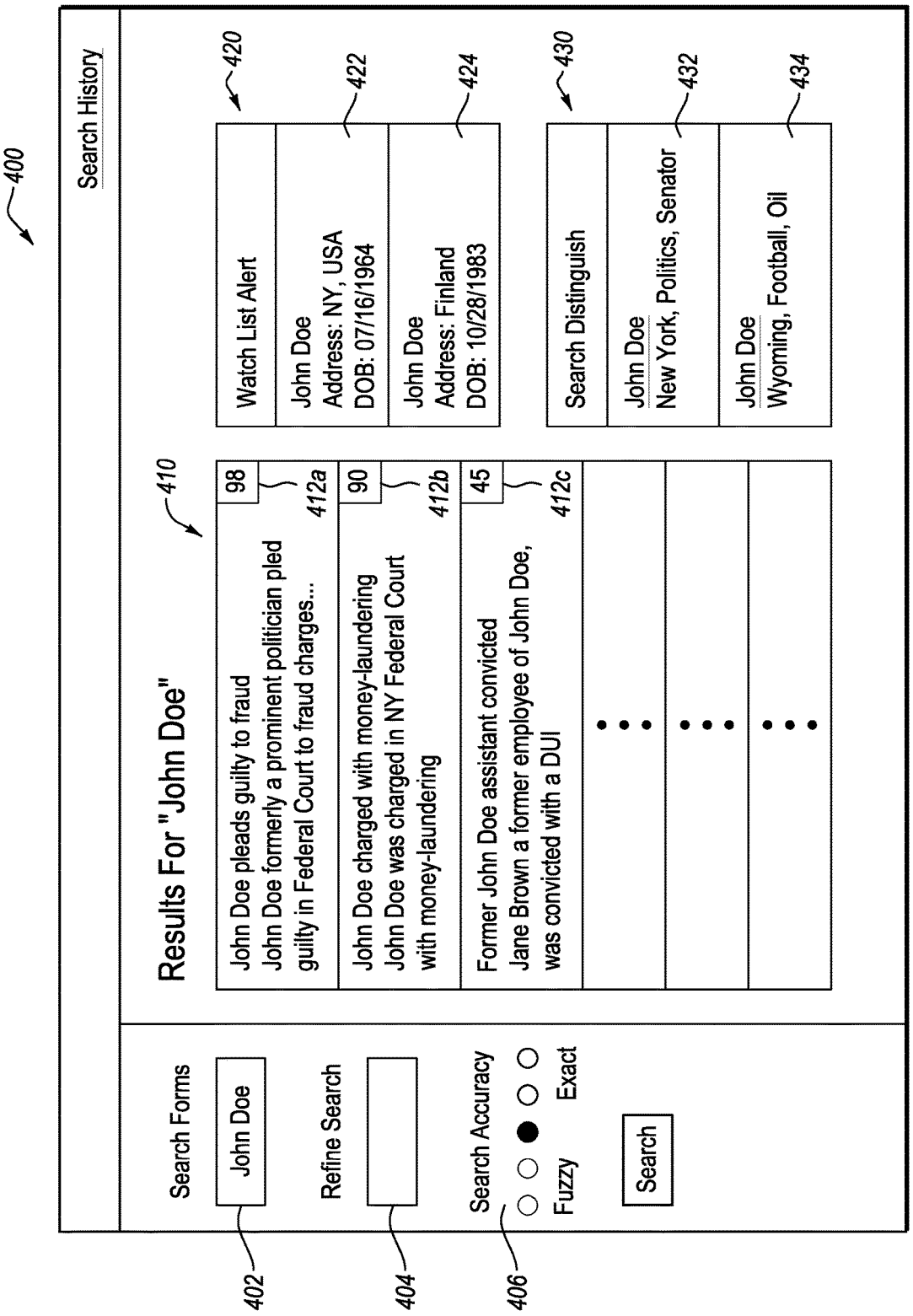
FIG. 4 illustrates a user interface configured to display search results in accordance with an implementation of the present invention.

FIG. 4 illustrates a user interface configured to display search results in accordance with one or more implementations of the present invention. For example, FIG. 4 displays the search results for a search target of "John Doe." The depicted search results interface 400 comprises a "Search Focus" section, a "Search Results" section 410, a "Watchlist Search" section 420, and a "Search Distinguish" section 430. Alternate implementations may divide the information among different categories or may include additional information.

The Search Focus section can provide various controls relating to the search. For example, the Search Focus section can include an additional search box 402 for further refining the search. Entering additional search parameters into this search box may search for the additional search parameters within the previously found list of search results. Additionally, the Search Focus section can comprise a "Search Accuracy" component 406 that allows a user to specify how closely associated the characterization must be to search target. For example, increasing the Search Accuracy may decrease the threshold distance that a data structure search target can be from the search target and still be accounted.

The Search Results section 410 comprises a listing of at least a portion of the search results. The depicted results may include a link to the original data source, a summary of each result, and a classifier rank 412(*a-b*). The search results can be ordered by rank or score 412(*a-b*). Additionally, the results can be associated with a particular visual indication, such as a color, that indicates the rank or score 412(*a-b*). For example, the rank or score 412(*a-b*) can be in red if the ranking is 98 and above, and can appear in orange if the ranking is between 90 and 98. Accordingly, these and other implementations of the present invention can provide a user with a quickly identifiable indication regarding the calculated association between the search target and derogatory information within the respective search result.

The Watchlist Search section 420 can display results 422, 424 from one or more specific, curated databases. For example, the Watchlist Search Section 420 may display results from government watch lists. As such, receiving a result within the Watchlist Search Section 420 may provide particular cause for concern and consideration.

The Search Distinguish section 430 may provide an interface for distinguishing between multiple unique data results for a single search target. For example, there may exist many "John Does" within the United States. As such, a search for John Doe may return a large amount of data, only a portion of which is related to the John Doe of interest.

In at least one implementation, the search module 130 can identify statistical correlations within the returned data results. The search module 130 can use the correlations to identify the potential presence of multiple distinct individuals within the search results. The search distinguish section 430 can then be used to display the proposed different search results.

For instance, search result 432 comprises "John Doe," but the search distinguish section 430 also indicates that this John Doe is correlated with New York, Politics, and Senator. In contrast, search result 434 for "John Doe" is shown as being correlated with Wyoming, football, and oil. Using the search distinguish section 430, a user can identify that he or she is interested in a John Doe who is a senator from New York. The user can then select data result 432. The data results section 410 can then automatically update itself to only display the data results correlated the John Doe 432. In contrast, in at least one implementation, the data results section 410 can automatically update itself by removing all data results that are correlated with John Doe 434.

In addition to depicting information associating the search result with the search target, at least one implementation of the search results interface 400 can depict information regarding related people (not shown), related companies (now shown), and location. Specifically, within a Related People section and a Related Companies section, a listing of other people and companies that are found within the search result can be listed. For example, a particular individual may be found within an article dealing with white-collar crime. The article may also comprise a listing of the companies involved and other individuals who were involved. Display 400 could then include a Related People section and Related Companies section that display the various identified related individuals and companies, such that a user can identify any associations that are of concern.

Accordingly, FIGS. 1-4 and the corresponding text illustrate or otherwise describe one or more components, modules, and/or mechanisms for identifying derogatory information associated with a search target. One will appreciate that implementations of the present invention can also be described in terms of methods comprising one or more acts for accomplishing a particular result. For example, FIGS. 5 and 6 and the corresponding text illustrate or otherwise describe a sequence of acts in a method for identifying derogatory information associated with a search target. The acts of FIGS. 5 and 6 are described below with reference to the components and modules illustrated in FIGS. 1-4.

Figure 5:
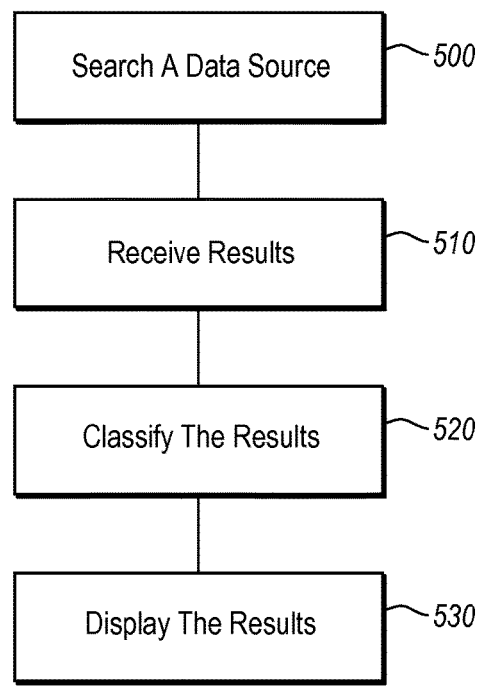
FIG. 5 illustrates a flowchart for a series of steps in a method in accordance with an implementation of the present invention.
Figure 6:
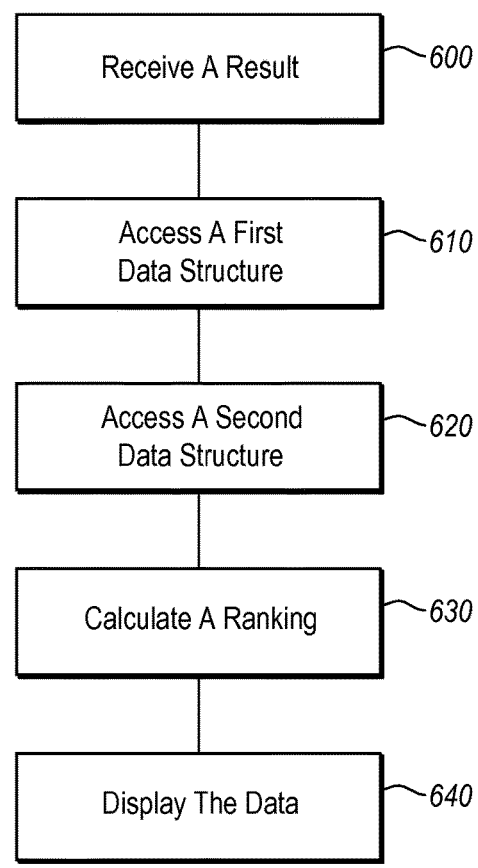
FIG. 6 illustrates a flowchart for a series of acts in a system in accordance with an implementation of the present invention.

For example, FIG. 5 illustrates that a method for searching one or more information sources and identifying and reporting derogatory information may include an act 500 of searching a data source. Act 500 includes searching one or more data sources for a user-provided search target. For example, in FIG. 1 and the accompanying description, the search module 130 receives a search target and searches various external data sources 120(*a-c*). In at least one implementation, searching external data sources comprises submitting the search target to an external search engine.

FIG. 5 also shows that the method can comprise an act 510 of receiving results. Act 510 includes receiving one or more data results from the search of the one or more data sources. For example, FIG. 1 and the accompanying description depict the search module receiving data results from the external data sources 120(*a-c*) in response to its search request.

Additionally, FIG. 5 also shows that the method can comprise an act 520 of classifying the results. Act 520 includes classifying the one or more data results based upon the association of the user-provided search target with a derogatory attribute. The derogatory attribute can be determined based upon the content within each of the one or more data results. For example, FIGS. 1 and 2, and the accompanying descriptions, depict a classifier module 134 that can classify data results based upon the presence and location of data structure search targets and various weighing values associated with the respective data structure search targets.

Further, FIG. 5 also shows that the method can comprise an act 530 of displaying the results. Act 530 includes displaying an indication of at least a portion of the classified one or more data results with an indication of a cumulative ranking for each of the one or more data results. For example, FIG. 4 depicts a user interface for displaying search results and cumulative rankings 412(*a-c*).

In addition to the foregoing, FIG. 6 illustrates that an additional or alternative method performed by a system can comprise an act 600 of receiving a result. Act 600 includes receiving a data result that comprises at least one instance of a user-provided search target. For example, FIG. 1 and the accompanying description depict the search module receiving data results from the external data sources 120(*a-c*) in response to its search request.

FIG. 6 also shows that the method performed by the system can comprise an act 610 of accessing a first data structure. Act 610 includes accessing at a first memory location a first data structure that contains one or more first data structure search targets, wherein the first data structure is associated with a first weighting factor. For example, FIGS. 1 and 2, and the accompanying descriptions, depict and describe a first data structure 200 that can be accessed by the classifier module 134 within data store 138. The first data structure 200 can comprise various first data structure search targets, and the first data structure 200 can be associated with a particular weighting factor.

Additionally, FIG. 6 also shows that the method performed by the system can comprise an act 620 of accessing a second data structure. Act 620 includes accessing at a second memory location a second data structure that contains one or more second data structure search targets. The second data structure can be associated with a second weighting factor, which is different than the first weighting factor. For example, FIGS. 1 and 2, and the accompanying descriptions, depict and describe a second data structure 200 that can be accessed by the classifier module 134 within data store 138. The second data structure 200 can comprise various second data structure search targets, and the second data structure 200 can be associated with a particular weighting factor.

Further, FIG. 6 also shows that the method executed by the system can comprise an act 630 of calculating a ranking. Act 630 includes calculating a ranking of the data result based upon a number of first data structure search targets that are within at least a portion of the data result, the first weighting factor, a number of second data structure search targets that are within the at least a portion of the data result, and the second weighting factor. For example, as disclosed with respect to FIG. 1, classifier module 134 can multiply the number of first data structure search targets and second data structure search targets found within a particular portion of a search result by their respective first data structure weighting factor and second data structure weighting factor. A resulting number can be used as a ranking or score to determine the strength of association between the data structure target words and the search target.

Further still, FIG. 6 also shows that the method executed by the system can comprise an act 640 of displaying the data. Act 640 includes displaying the ranking for the data result. For example, FIG. 4, and the accompanying description, discloses a search results interface 400 that displays the various data results and associated rankings 412(*a-b*). As used herein, ranking and scoring comprise an indication of the strength of association between the words within the data structures and the search target.

Accordingly, FIGS. 1-6 and the corresponding text illustrate or otherwise describe a number of components, schematics, and mechanisms for identifying derogatory information, as it relates to a particular search target. One will appreciate that this can provide significant value to organization and individuals attempting to search dynamic databases for characterized information. Additionally, implementations of the present invention will provide significant benefits in creating easily documented and reproducible searches that can create "paper trails" for auditing searches. One will appreciate that the components and modules disclosed herein can also be used for identifying derogatory information associated with more than just money laundering. For example, in at least one implementation, derogatory information can be identified and classified as it relates to a particular pharmaceutical drug.

Additionally, various implementations of the present invention provide real-time information relating to a particular search because the search is not constrained to human generated databases. Similarly, implementations of the present invention search multiple data sources, including the Internet, simultaneously. Further, various implementations of the present invention provide an easily auditable system where previous searches and user selections are stored within a structured database. Additionally, implementations of the present invention provide a search structure that can create uniformity across an organization that performs a large number of searches. For example, some organizations may run searches by allowing different users to each craft their own search. This may generate sporadic search results and inconstancies in identifying derogatory information. Accordingly, embodiments of the present invention provide a search system that provides up-to-date results, using a consistent and easily auditable system.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computerized environment comprising a search propagation module and a search ranking module, a computerized method for searching one or more information sources and identifying and reporting characterized information, the method comprising:
    searching one or more data sources for a user-provided search target;
    receiving one or more data results from the search of the one or more data sources;
    classifying the one or more data results based upon the association of the user-provided search target with a derogatory attribute that is determined based upon the content within each of the one or more data results, wherein classifying the one or more data results comprises:
        accessing at a first memory location a first data structure that contains one or more first data structure search targets, wherein the first data structure is associated with a first weighting factor;
        determining a number of first data structure search targets that are within at least a portion of a particular data result;
        calculating a first ranking based upon the first weighting factor and the number of first data structure targets that are present within the at least the portion of the particular result;
        accessing at a second memory location a second data structure that contains one or more second data structure targets, wherein the second data structure is associated with a second weighting factor, which is a different than the first weighting factor;
        determining a number of second data structure search targets that are within at least a portion of the particular data result;
        calculating a second ranking based upon the second weighting factor and the number of second data structure targets that are present within the at least the portion of the particular result; and
        calculating the cumulative ranking of the particular data result based upon the first ranking and the second ranking; and
    displaying an indication of at least a portion of the classified one or more data results with an indication of a cumulative ranking for each of the one or more data results.

2. The method as recited in claim 1, further comprising:
    determining that one or more first data structure search targets are within a specific portion of the particular data result;
    calculating the cumulative ranking of the particular data result based upon the first ranking, the second ranking, and a locational weighting, wherein the locational weighting is based upon the determination that one or more first data structure search targets are within the specific portion of the particular data result.

3. The method as recited in claim 2, wherein the specific portion of the particular data result comprises a title of the particular data result.

4. The method as recited in claim 2, wherein the locational weighting is greater than the first weighting factor and the second weighting factor.

5. The method as recited in claim 1, further comprising:
    receiving a sensitivity factor, wherein the sensitivity factor comprises a threshold number;
    calculating a first ranking based upon the first weighting factor and the number of first data structure search targets that are within the threshold number of words from the location of the user-provided search target; and
    calculating the second ranking based upon the second weighting factor and the number of second data structure search targets that are within the threshold number of words from the location of the user-provided search target.

6. The method as recited in claim 1, further comprising:
    a third data structure that comprises third data structure search targets, wherein the third data structure is associated with a third weighting factor that is different than both the second weighting factor and the first weighting factor.

7. The method as recited in claim 1, wherein the one or more first search targets comprise single terms.

8. The method as recited in claim 7, wherein the one or more second search targets comprise phrases of one or more terms.

9. The method as recited in claim 1, wherein calculating the first ranking comprises dividing the number of first data structure search targets that are within the at least the portion of the particular data result by a total number of terms within the particular data result.

10. The method as recited in claim 1, further comprising:
    automatically re-running searches for the user-provided search target at specific periodic time intervals;
    identifying one or more new data results that were not received in previous searches;

classifying the one or more new data results based upon the association of the user-provided search target with the derogatory attribute; and displaying at least a portion of the one or more new data results with an indication of the cumulative ranking for each of the one or more new data results.

11. The method as recited in claim 10, further comprising:

determining that a particular new data result comprises a cumulative ranking that is above a ranking threshold value; and notifying a user about the particular new data result.

12. The method as recited in claim 1, further comprising:

identifying a particular user-provided search target that is provided by multiple distinct users within a threshold amount of time; and providing at least a portion of the multiple distinct users with a warning indication relating to the particular user-provided search target, wherein the warning indication is triggered by the particular user-provided search target being provided by multiple distinct users within the threshold amount of time.

13. The method as recited in claim 1, further comprising:

identifying within at least a portion of the one or more data results one or more statistical trends regarding terms and content within each of the at least the portion of the one or more data results;

determining that at least a portion of the one or more statistical trends forms a first group that does not overlap with other identified statistical trends; and identifying the one or more data results associated with the first group as being related to a distinct subset of the particular user-provided search target.

14. A computer system, comprising:

one or more processors;

system memory; and one or more computer-readable media storing computer-executable instructions that, when executed by the one or more processors, cause the computer system to implement a method for providing a user with ranked search results, the method comprising:

receiving a data result that comprises at least one instance of a user-provided search target;

accessing at a first memory location a first data structure that contains one or more first data structure search targets, wherein the first data structure is associated with a first weighting factor;

accessing at a second memory location a second data structure that contains one or more second data structure search targets, wherein the second data structure is associated with a second weighting factor, which is different than the first weighting factor;

calculating a ranking of the data result based upon a number of first data structure search targets that are within at least a portion of the data result, the first weighting factor, a number of second data structure search targets that are within the at least a portion of the data result, and the second weighting factor, wherein the at least a portion of the data result comprises terms that are within a threshold number of words from the location of the user-provided search target; and displaying the ranking for the data result.

15. The computer system as recited in claim 14, wherein each of the first data structure search targets comprises less terms than each of the second data structure search targets.

16. The computer system as recited in claim 14, wherein calculating the ranking only accounts for the number of first data structure search targets that are within a threshold number of terms of the user-provided search target within the data result.

17. The computer system as recited in claim 16, wherein calculating the ranking only accounts for the number of second data structure search targets that are within the threshold number of terms of the user-provided search target within the data result.

18. A computer program product comprising one or more computer storage media having stored thereon computer-executable instructions that, when executed at a processor, cause the computer system to perform a method for searching one or more information sources and identifying and reporting characterized information, the method comprising:

searching one or more data sources for a user-provided search target;

receiving one or more data results from the search of the one or more data sources;

classifying the one or more data results based upon the association of the user-provided search target with a derogatory attribute, wherein the derogatory attribute is determined based upon the content within each of the one or more data results;

displaying an indication of at least a portion of the classified one or more data results with an indication of a cumulative ranking for each of the one or more data results;

identifying a particular user-provided search target that is provided by multiple distinct users within a threshold amount of time, and providing at least a portion of the multiple distinct users with a warning indication relating to the particular user-provided search target, wherein the warning indication is triggered by the particular user-provided search target being provided by multiple distinct users within the threshold amount of time.

19. In a computerized environment comprising a search propagation module and a search ranking module, a computerized method for searching one or more information sources and identifying and reporting characterized information, the method comprising:

searching one or more data sources for a user-provided search target;

receiving one or more data results from the search of the one or more data sources;

classifying the one or more data results based upon the association of the user- provided search target with a derogatory attribute, wherein the derogatory attribute is determined based upon the content within each of the one or more data results;

displaying an indication of at least a portion of the classified one or more data results with an indication of a cumulative ranking for each of the one or more data results;

automatically re-running searches for the user-provided search target at specific periodic time intervals;

identifying one or more new data results that were not received in previous searches;

classifying the one or more new data results based upon the association of the user-provided search target with the derogatory attribute; and displaying at least a portion of the one or more new data results with an indication of the cumulative ranking for each of the one or more new data results.

20. The method as recited in claim 19, further comprising:
identifying a particular user-provided search target that is provided by multiple distinct users within a threshold amount of time; and
providing at least a portion of the multiple distinct users with a warning indication relating to the particular user-provided search target, wherein the warning indication is triggered by the particular user-provided search target being provided by multiple distinct users within the threshold amount of time.

21. The method as recited in claim 19, further comprising:
identifying within at least a portion of the one or more data results one or more statistical trends regarding terms and content within each of the at least the portion of the one or more data results;
determining that at least a portion of the one or more statistical trends forms a first group that does not overlap with other identified statistical trends; and
identifying the one or more data results associated with the first group as being related to a distinct subset of the particular user-provided search target.

\* \* \* \* \*